Feb. 19, 1935.  W. C. BETZ  1,991,723
BEARING SEAL
Filed June 5, 1933
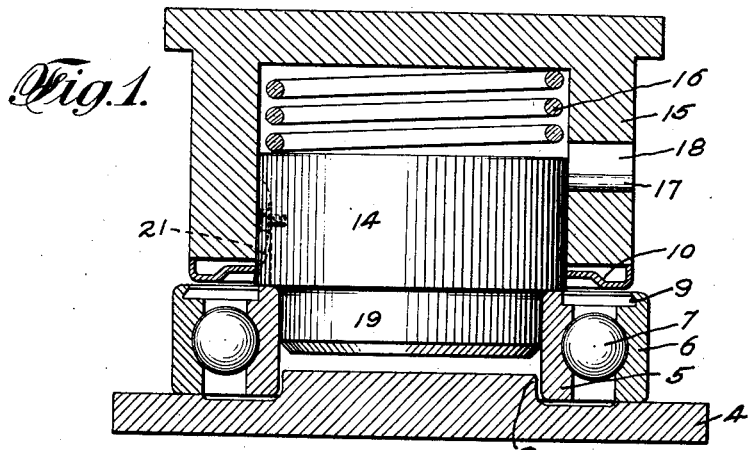
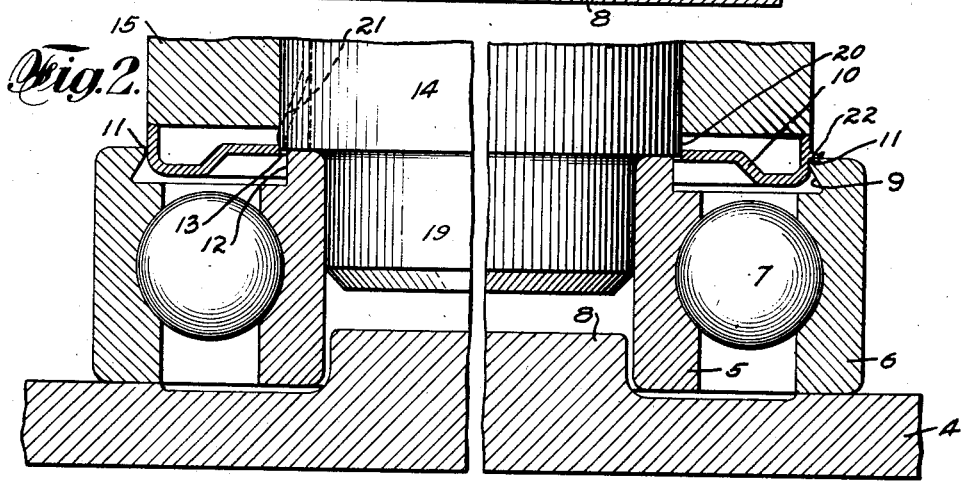
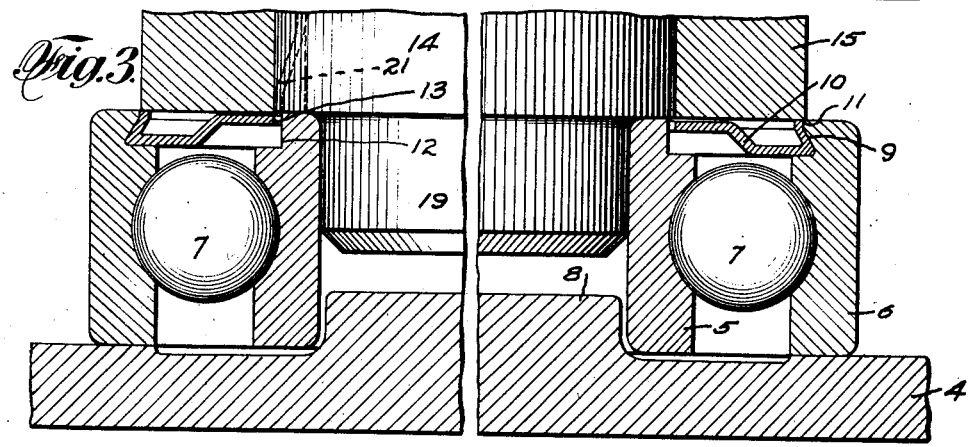
INVENTOR
WILLIAM C. BETZ
BY
ATTORNEYS Patented Feb. 19, 1935

1,991,723

UNITED STATES PATENT OFFICE 1,991,723

BEARING SEAL

William C. Betz, New Britain, Conn., assignor to
The Fafnir Bearing Company, New Britain,
Conn., a corporation of Connecticut Application June 5, 1933, Serial No. 674,398

9 Claims. (Cl. 29—84)

My invention relates to a bearing seal and more particularly to a method of and apparatus for securing the bearing seal to one of the bearing rings of an anti-friction bearing.

It has been common practice to secure a bearing seal ring, usually of sheet metal, to one of the rings of an anti-friction bearing by simply positioning the seal ring in a groove and then swedging or otherwise bending or deforming the seal ring so as to cause the latter to be rigidly secured to the bearing. Such seal rings have usually been positioned in a groove cut in the inner surface of the outer bearing ring. If the seal ring is concentric as to its inner and outer diameters and the bearing rings are concentric with each other (as they should be and usually are), and the undercut groove or the like for receiving the seal ring is also concentric with the two bearing rings, a seal ring secured by the above method will be satisfactory in that the seal ring will be rigidly secured to one of the rings (usually the outer), and the inner edge of the seal ring will be concentric with and may be positioned concentric with and quite close to the inner ring. However, to secure concentricity of all parts and surfaces above mentioned is often expensive in that considerable care must be exercised in the manufacture and the maintenance of close tolerances.

Furthermore, if either or both of the bearing rings need to be chucked more than once during their manufacture, it is seldom possible to secure exact concentricity of the turned surfaces formed during two different chuckings. For example, if an outer bearing ring is formed in one machine and the ring is then re-chucked in another machine for forming an undercut groove therein, it is seldom that the undercut groove will be truly concentric with other surfaces of such ring, and if the seal ring is then swedged or otherwise secured in place in such a groove, the opposite edge thereof will seldom be concentric with the other bearing ring, and for that reason the desirable small clearance between such edge of the seal ring and said other bearing ring is seldom attainable under such usual manufacturing conditions.

It is the principal object of my invention, therefore, to provide a method of and apparatus for securing a seal to one of the rings of an anti-friction bearing where close manufacturing tolerances need not be necessarily maintained and yet the bearing seal will be rigidly secured and be concentric with the part or ring desired.

Other objects and features of advantage will either be hereinafter pointed out or will become apparent to those skilled in the art.

Briefly stated, in a preferred form of the invention I provide one of the bearing rings of an anti-friction bearing comprising inner and outer bearing rings and interposed anti-friction bearing members, with an undercut groove for the reception of the seal ring usually formed of sheet metal. In placing or securing the seal ring, the latter is piloted, for example, at its inner edge relatively to, say, the bore through the inner ring so that the inner edge of the seal ring will be concentric with and in close proximity to an outer surface on the inner ring. While the seal ring is maintained in such concentric relation with the desired surface of the inner ring, the outer edge of the seal ring is forced toward the undercut groove and if either the seal ring is too large or misshapen at the outer edge, or the undercut groove is not concentric with the inner ring, the outer edge of the seal ring is formed or shaped or sheared by the edge of the outer ring adjacent the groove so that the seal ring is accurately and definitely positioned relatively to the outer ring and is still piloted in definite concentric relation with the desired surface on the inner ring. Thereafter, the outer edge is deformed or swedged so as to cause it to flow into or become tightly engaged in the undercut groove, and, due to its prior positioning, whether or not it remains piloted during the swedging operation, the inner edge will remain concentric with the desired surface on the inner bearing ring, and therefore such inner edge may be positioned in very close proximity to the desired surface of the inner bearing ring. Thus, ordinary manufacturing tolerances only need be maintained, and yet the final desired result in attaching the seal will be the same as if the highest grade precision manufacturing methods had been followed in forming the seal ring and groove for receiving the same.

In the drawing which shows, for illustrative purposes only, a preferred form of the invention:—

Fig. 1 is a central, sectional view through an anti-friction bearing and means for setting the bearing seal illustrating features of the invention;

Fig. 2 is a similar but fragmentary, enlarged view of parts shown in Fig. 2, the parts being differently positioned;

Fig. 3 is a view similar to Fig. 2, certain parts being in still a different position.

In said drawing, 4 indicates means such as a bed or platen of a press for supporting an anti-friction bearing comprising an outer ring 6, and inner ring 5 with interposed anti-friction bearing members such as balls 7. The anti-friction bearing is roughly held or piloted on the platen, in the present instance from the bore of the inner ring, by means of an upstanding boss 8 on the platen. One of the rings (in this case the outer ring) is provided with a groove 9 which is undercut to receive and hold the outer edge of the seal ring 10. In the preferred form, the upper edge of the groove or that part of the outer ring defining the upper edge or part adjacent the upper edge of the undercut groove 9, is preferably left quite sharp, as indicated at 11, for a purpose to be described. In the particular form shown, the inner ring opposite the groove 9 is turned down or rabbeted, as indicated at 12, and the inner edge 13 of the seal ring is designed to be positioned concentric with and very closely adjacent to such rabbeted surface 12. In the drawing, for the sake of clarity, the desirable close clearance between the inner edge 13 of the ring and the surface 12 has been increased. The invention is particularly advantageous as will be later described, in connection with bearings in which the groove 9 may not be quite concentric with the other bearing surfaces, such as the surface 12, or the inner or outer surface of the outer ring 6; and, as shown in the drawing, the undercut ring 9 is shown slightly eccentric.

In placing the seal ring 10 I employ a ram or punch, in the present instance comprising an inner punch part 14, and a relatively movable outer punch part 15 with an interposed spring 16 tending to separate the two punch parts. The relative movement may be limited by a pin 17 carried by the punch part 14 and movable in a slot 18. The combined ram or punch is carried by the ram or punch of the press as will be understood.

One of the punches is piloted relatively to one of the rings. In the present instance the punch part 14 is illustrated as having a pilot nose 19 to engage and be piloted in the bore of the inner ring 5. Above the pilot nose 19 on the surface 20 of the punch part 14, the inner edge of the seal ring 10 is designed to fit quite closely and may be held by any suitable means such as one or more spring fingers 21. Needless to say, the surface 20 which fits quite tightly within the inner edge or bore of the seal ring 10, is concentric with the turned down or rabbeted surface 12 of the inner ring.

With the parts positioned as illustrated in Fig. 1, the inner punch part 14 is accurately piloted in the inner bearing ring, and its further downward movement is prevented by the engagement of the shoulder on the punch part 14 with the top edge of the inner bearing ring. Pressure now applied to the punch part 15 will force the seal ring 10 downwardly and permit the inner edge to slide on its piloting portion 20, and if the outer edge of the seal ring 10 be irregular or eccentric to the inner surface or bore 13 thereof, or if the groove 9 be eccentrically turned the outer edge of the seal ring 10 will be shaped, deformed or sheared, as indicated at 22, by the adjacent edge of the bearing ring 6 at whichever points there may be interference or contact between the outer edge of the seal ring and the outer bearing ring 6. Thus, the seal ring, which normally is preferably slightly oversize, will be shaped or formed and definitely located relatively to the outer ring while the inner edge of the seal ring is still piloted on the piloting portion 20 of the ram part 14. Further depression of the punch part 15 in the particular form shown will cause the seal ring to move on the piloting portion 20, but since the seal ring has now been definitely positioned in the outer ring, such further depression of the punch part 15 to the position shown in Fig. 2 which swedges the outer edge into the undercut groove 9 will not throw the inner edge 13 of the seal ring out of concentricity with the rabbeted surface 12 and when the seal ring has been finally swedged into place, for example as indicated in Fig. 3, the inner edge 13 of the seal ring will be concentric with the rabbeted surface 12 and, as stated, the clearance may be made as slight as desired.

It will thus be seen that without close manufacturing tolerances in forming the bearing rings and seal rings, it is possible to provide and set a seal ring so that the latter will produce the results which ordinarily would require precision methods of manufacture not always practicable in commercial operations.

While the invention has been described in considerable detail and a specific method and apparatus disclosed, it is to be understood that various changes, modifications, additions, and omissions may be made within the scope of the invention as defined in the appended claims.

I claim:

1. The method of securing a seal ring to one of the rings of an anti-friction bearing comprising inner and outer rings with interposed anti-friction bearing members which comprises, piloting one edge of the seal ring relatively to the axis of one of the bearing rings and while so piloting said seal ring engaging the other edge thereof with the other bearing ring to definitely position the seal ring radially relatively thereto, and swedging the said other edge of the seal ring by pressure applied directly to said other edge to secure the same to said last mentioned bearing ring.

2. The method of securing a seal ring to one of the bearing rings of an anti-friction bearing comprising inner and outer bearing rings with interposed anti-friction bearing members which comprises, piloting the seal ring at one of its edges so as to hold the same concentric with a surface of one of said bearing rings and while so piloting said seal ring engaging the other edge thereof with said other bearing ring to definitely position said seal ring relatively thereto, then unpiloting said seal ring and swedging the same to rigidly secure the same to one of said bearing rings.

3. The method of securing a seal ring in an undercut groove in the outer ring of an anti-friction bearing comprising an outer ring and an inner ring with interposed anti-friction bearing members which comprises, piloting the inner edge surface of said seal ring relatively to the bore through said inner bearing ring and while so piloting said seal ring forcing the same toward said undercut groove so as to cause the outer edge of said seal ring to definitely engage and be positioned by the outer edge of said outer ring adjacent said undercut groove and then while said seal ring is so definitely positioned adjacent said undercut groove swedging said seal ring into tight fitting engagement with said undercut groove.

4. The method of securing a seal ring to one bearing ring of an anti-friction bearing comprising inner and outer bearing rings with interposed anti-friction bearing members, one of which rings having an eccentric circumferentially extending groove therein which comprises, piloting one edge of said seal ring concentric with one of the surfaces of one of said rings and while so piloting said seal ring engaging and forcing the opposite edge thereof past the outer edge of said eccentric groove whereby said seal ring may be deformed by the eccentrically positioned outer edge of said groove, and said seal ring will be definitely positioned relatively to said grooved ring, and swedging said opposite edge of said seal ring into said eccentric groove.

5. The method of securing a bearing seal ring to the outer ring of an anti-friction bearing comprising inner and outer bearing rings with interposed anti-friction bearing members, said outer ring having an undercut groove which may be eccentric with the axis of said bearing which comprises, piloting the inner edge of said seal ring relatively to a concentric surface of said inner ring with the outer edge positioned at least in part in overlapping relation to the outer edge of said outer bearing ring adjacent said groove, engaging the outer edge of said seal ring with said outer ring adjacent said undercut groove so as to definitely position said sealing ring relatively to said outer ring, then unpiloting said seal ring and swedging the outer edge thereof into said undercut groove.

6. The method of securing a bearing seal ring to one of the bearing rings of an anti-friction bearing comprising inner and outer bearing rings with interposed anti-friction bearing members which comprises, providing an undercut groove in one of said rings and a turned down or rabbeted surface on the other bearing ring opposite said undercut groove, piloting said seal ring relatively to and concentric with said rabbeted surface and while so piloting the same engaging the other edge of said seal ring with the outer edge of said ring adjacent said undercut groove in said one of said rings, and then directly engaging and forcing said last edge into said undercut groove and said entire seal ring into the space between said bearing rings with said piloted edge of said seal ring concentric with said rabbeted surface.

7. The method of securing a seal ring to one of the rings of an anti-friction bearing comprising inner and outer bearing rings with interposed anti-friction bearing members which comprises, piloting one edge of the seal ring concentrically with one of the rings of the anti-friction bearing while the other edge overlaps at least in part the outer edge of the bearing ring adjacent said groove and forcing the said other edge of said seal ring into engagement with the said outer edge of said bearing ring adjacent said groove to shape said other edge of said seal ring in conformity with the shape of the adjacent bearing ring while maintaining the concentricity between the first mentioned edge of said seal ring and bearing ring, and swedging the shaped edge of said seal ring into tight fitting engagement with the adjacent bearing ring.

8. The method of securing a seal ring to one of the bearing rings of an anti-friction bearing comprising inner and outer bearing rings with interposed anti-friction bearing members, which comprises piloting the seal ring relatively to one of said bearing rings and shaping one edge of said seal ring by engaging the said edge and forcing the same past and in engagement with an edge of one of said bearing rings, for the purpose described.

9. In a device of the character indicated for securing a sealing ring in a circumferential groove in one ring of an anti-friction bearing comprising inner and outer rings with interposed anti-friction bearing members which comprises, means for supporting the anti-friction bearing, a ram having a part for piloting a seal ring at one edge relatively to one of said bearing rings, and a part for engaging the opposite edge of said sealing ring and forcing the same into engagement with said grooved bearing ring to shape the seal ring and force the same into said groove.

WILLIAM C. BETZ.